(12) United States Patent
Mueller et al.

(10) Patent No.: US 10,029,131 B2
(45) Date of Patent: Jul. 24, 2018

(54) FAN UNIT (71) Applicant: Rosenbauer International AG, Lending (AT)

(72) Inventors: Michael Mueller, Graz-Ragnitz (AT); Uwe Koch, Wels (AT)

(73) Assignee: Rosenbauer International AG, Leonding (AT)

( * ) Notice: Subject to any disclaimer, the term of this patent is extended or adjusted under 35 U.S.C. 154(b) by 211 days.

(21) Appl. No.: 15/169,985

(22) Filed: Jun. 1, 2016

(65) Prior Publication Data

US 2016/0354623 A1 Dec. 8, 2016

(30) Foreign Application Priority Data

Jun. 3, 2015 (AT) .............. A 50456/2015

(51) Int. Cl.
*A62C 3/02* (2006.01)
*F04D 19/00* (2006.01)
*A62C 5/02* (2006.01)
(Continued)

(52) U.S. Cl.
CPC .............. *A62C 3/0207* (2013.01); *A62C 5/02* (2013.01); *F04D 19/002* (2013.01); *F04D 25/04* (2013.01);
(Continued)

(58) Field of Classification Search
CPC .......... A62C 3/0207; A62C 5/02; F24F 11/79; F24F 7/007; F24F 2221/12; F24D 19/002;
(Continued)

(56) References Cited

U.S. PATENT DOCUMENTS 2,950,859 A * 8/1960 Kirk .................. F04D 29/526
415/119
3,296,739 A * 1/1967 Wiegel .............. A01G 13/065
239/77
(Continued)

FOREIGN PATENT DOCUMENTS

DE 20 2011 052 116 U1 1/2012
WO 2013/182536 A1 12/2013

*Primary Examiner* — Alexander Valvis
*Assistant Examiner* — Tuongminh Pham
(74) *Attorney, Agent, or Firm* — Collard & Roe, P.C.

(57) ABSTRACT

The invention relates to a fan unit (1) for mobile use for ventilating an area in which it is deployed, in particular for circulating fresh air in areas contaminated by smoke or gases, which comprises a main frame (2), having a lifting frame (4) mounted thereon and an axial fan (3). A first pivot arrangement (8) for the lifting frame (4) is disposed on the one hand in the region of a frame part (7) extending up from a base frame (6) and on the other hand in a first end region (14) of the lifting frame (4) facing the frame part (7). The lifting frame (4) can be adjusted in terms of its vertical distance from the base frame (6) from a non-operating position lying closer thereto into a raised deployment position. A second pivot arrangement (17) is disposed on the lifting frame (4) about which a support frame (19) is mounted so as to be pivotable in terms of its relative position with respect to the base frame (6). The axial fan (3) is retained on the lifting frame (4) with the support frame (19) connected in between.

23 Claims, 6 Drawing Sheets

(51) Int. Cl.
 *F24F 7/007* (2006.01)
 *F16M 3/00* (2006.01)
 *F04D 25/04* (2006.01)
 *F04D 25/10* (2006.01)
 *F04D 29/60* (2006.01)
 *F24F 11/79* (2018.01)

(52) U.S. Cl.
 CPC ............ *F04D 25/10* (2013.01); *F04D 29/601* (2013.01); *F16M 3/00* (2013.01); *F24F 7/007* (2013.01); *F24F 11/79* (2018.01); *F24F 2221/12* (2013.01)

(58) Field of Classification Search
 CPC ........ F24D 25/04; F24D 25/10; F24D 29/601; F24D 29/522; F16M 3/00
 USPC ............ 239/289, 290, 722, 280.5, 176, 310; 169/70, 51, 52, 91; 415/216; 211/1.53, 211/1.51, 26, 85.8, 13.1, 170, 168, 173
 See application file for complete search history.

(56) References Cited

U.S. PATENT DOCUMENTS

| | | | | |
|---|---|---|---|---|
| 5,395,087 | A | | 3/1995 | Vanbasten |
| 5,538,188 | A | * | 7/1996 | Simonette ................ B05B 1/00 239/591 |
| 5,941,314 | A | | 8/1999 | Weinmeister et al. |
| 6,086,053 | A | * | 7/2000 | Natschke ............. A01K 1/0082 261/30 |
| 6,283,709 | B1 | * | 9/2001 | Hill ....................... F04D 25/105 416/100 |
| 6,340,283 | B1 | * | 1/2002 | Hedger ................. F04D 25/166 415/121.2 |
| 2004/0035947 | A1 | * | 2/2004 | Ratnik ..................... B05B 1/14 239/2.2 |
| 2013/0219933 | A1 | * | 8/2013 | Hubert ................. F04D 19/002 62/121 |

* cited by examiner

FAN UNIT

CROSS REFERENCE TO RELATED APPLICATIONS

Applicant claim priority under 35 U.S.C. § 119 of Austrian Application No. A 50456/2015 filed on Jun. 3, 2015, the disclosure of which is incorporated by reference.

The invention relates to a fan unit for mobile use for ventilating an area in which it is deployed, in particular for circulating fresh air in areas contaminated by smoke or gases.

DE 20 2011 052 116 U1 describes a fan unit for mobile use for circulating fresh air in areas contaminated by smoke. The fan unit in this instance comprises a main frame, a pivot frame and an axial fan retained on the pivot frame. The main frame has a base frame which can be directed so that it faces a support surface and a rear frame part extending upwards from the base frame. The pivot frame is mounted on the main frame so as to be pivotable about a first pivot axis of a first pivot arrangement extending in a horizontal direction. The axial fan has a drive unit, a fan wheel connected to it in a driving arrangement and a fan housing accommodating the fan wheel.

U.S. Pat. No. 5,395,087 A describes another fan unit for mobile use for generating an air flow to be circulated. The fan unit in this instance comprises a main frame and a pivot frame pivotably mounted thereon. The axial fan is mounted directly on the pivot frame. Depending on the position of usage and hence the resultant orientation of the air flow, the pivot frame together with the axial fan can be pivoted to adjust its relative position about a pivot arrangement disposed on the main frame in a position close to the floor. The pivot frame can be retained in this set position relative to the main frame by means of a latching mechanism.

A fan unit of a similar design is described in U.S. Pat. No. 5,941,314 A. The fan unit in this instance comprises a main frame comprising a tubular frame. Disposed to the side of the axial fan are frame parts which are connected to one another at their rear face by means of a bow-shaped handle. The axial fan mounted on the two lateral frame parts can be pivoted into different positions in a bearing arrangement having bearing points disposed at a distance apart from one another. The inclination of the axial fan relative to the main frame can also be adjusted by means of the bearing arrangement, which is stationary relative to the support surface.

A mobile large fan mounted on a double rocker is known from WO 2013/182536 A1. The housing of the fan unit is mounted directly on at least one end of an arm of the double rockers so as to be pivotable. By means of an additional adjusting means, the relative position of the housing of the fan unit and hence the inclination thereof can be varied in order to change the direction in which the air flow is emitted. Based on other embodiments, the housing of the fan unit is mounted on both ends respectively of each arm of the double rockers disposed at a distance apart from a base stand so as to be directly pivotable thereon. The inclination of the housing of the fan unit can be adjusted either by changing the position of an arm of the double rockers relative to the base stand or by adjusting the length of an arm of the double rockers.

The underlying objective of this invention is to propose a fan unit which is of small dimensions for transport purposes but nevertheless generates a sufficient air flow during use or operation of the axial fan, and the latter can be pre-set within a range of angles in terms of its flow direction.

This objective is achieved by the invention due to the fact that the first pivot arrangement for the lifting frame is disposed on the one hand in the region of the frame part extending up from the base frame and on the other hand in a first end region of the lifting frame facing the rear frame part, and the lifting frame is designed so that it projects out from the rear frame part in the direction towards a front face, and a second end region of the lifting frame spaced apart from the first end region can be adjusted in terms of its vertical distance from the base frame from a non-operating position lying closer to the base frame into a deployment position raised relative thereto, and a second pivot arrangement with a second pivot axis is disposed on the lifting frame, which second pivot arrangement is disposed at a distance apart from the first pivot arrangement, and a support frame is mounted on the lifting frame so as to be pivotable in terms of its relative position with respect to the base frame about the second pivot axis of the second pivot arrangement, thereby enabling an inclination of the air flow generated by the axial fan to be adjusted, and the axial fan is retained on the lifting frame with the support frame connected in between.

The advantage obtained as a result is that a compact overall frame and/or main frame can be obtained which provides a stable but portable mount for the axial fan. Due to the fact that in this example of an embodiment the base frame is preferably of a continuous and/or trough-shaped design, a better air flow can be obtained on the floor side in the region of the axial fan between the latter and the main frame due to the pivoting movement of an end region provided for the lifting frame and the associated increase in the distance from the base frame. Due to the arrangement enabling lifting for operating purposes and subsequent lowering for stowage, a smaller size can be obtained for transportation, and during operation, the lifting frame is in the raised position and the axial fan is raised with it, thereby enabling an optimum air flow to be obtained. By additionally providing a separate support frame for the axial fan, not only can the axial fan be raised and thus moved so that it sits at a greater distance from the base frame disposed on the floor, an adjustment to the inclination of the axial fan is also now made possible. This adjustment of the inclination means that the direction in which the air flow generated by the axial fan is emitted can be easily adjusted to suit the respective deployment conditions.

It is also of advantage if the lifting frame is formed by a pivot arm of a bridge-type design. Due to this bridge-type design of the pivot arm, a double shear mounting can be obtained for it on the main frame, in particular on its rear frame part. The lifting frame projecting out from the first pivot arrangement forms a pivot arm mounted on one side and can therefore be moved by its end region disposed at a short distance therefrom from its non-operating position into the raised deployment position which is higher and at a greater distance from the base frame.

Based on another distinctive embodiment, the first pivot arrangement is disposed at a distance apart from the base frame of the main frame in the vertical direction. This enables a geometric arrangement of the individual components of the pivot arrangement and the lifting frame connected to it to be obtained with respect to one another, resulting in a shorter height for carrying purposes than the height during ongoing operation.

Another preferred embodiment is characterized by the fact that the second pivot axis of the second pivot arrangement is oriented parallel with the first pivot axis. This makes 
it easy to mount and adjust the inclination of the axial fan retained on the support frame.

Another possible embodiment incorporates features whereby a pivot drive is provided on the main frame, in particular the rear frame part, for moving the lifting frame from its non-operating position into the raised deployment position and vice versa. Providing a separate pivot drive makes operation of the mutually engaging lever arrangements and/or joint arrangements much easier. As a result, it is easier for persons who are not very strong to move the axial fan of the fan unit from the non-operating and/or transport position into the raised deployment position and/or operating position.

Based on another embodiment, the pivot drive comprises at least one handle and at least one articulated lever, and the handle is mounted so as to be pivotable about a third pivot axis of a third pivot arrangement disposed on the rear frame part, and the at least one articulated lever is articulatingly linked to the at least one handle by its first end and is articulatingly linked to the lifting frame by its second end and the third pivot axis is oriented parallel with the first pivot axis. This means that already on being used for the first time, the raised deployment position and/or operating position of the axial fan can be obtained by pivoting the handle, in addition to which transportation of the entire fan unit from the transport vehicle to the deployment site is made easier.

Another embodiment is distinctive due to the fact that the third pivot arrangement is disposed farther from the base frame in the vertical direction than the first pivot arrangement. Due to this corresponding geometric arrangement of the individual pivot arrangements with respect to one another, the overall height can be kept relatively short whilst nevertheless enabling a simple adjusting movement for the operator and/or user raising the lifting frame.

Another preferred embodiment is characterized by the fact that a pivot bearing is disposed at a distance apart from the third pivot axis on the at least one handle forming an operating lever, on which pivot bearing the first end of the articulated lever is articulatingly linked to the handle. This obviates the need for an additional operating lever and thus results in a single compact unit. Not only does this make it easier to transport fan unit to and from the deployment site by means of the handle, raising the axial fan is also made easier at the same time.

It is also of advantage if articulated levers are provided respectively, spaced apart from one another in the direction of the second pivot axis, and in each case the second ends of the articulated levers are articulatingly connected to the lifting frame in alignment with the second pivot axis. This enables a common linkage of the articulated lever and a bearing for the support frame on the lifting frame. In addition, however, force can be transmitted on either side of the axial fan during the adjusting movement and during ongoing operation. This results in a stable and compact design.

Another embodiment is characterized by the fact that the handle is formed by a bow-shaped tubular frame and can be pivoted from a transport position oriented in an approximately horizontal direction into an operating position extending upright in an approximately vertical direction. This enables simultaneous operation and adjustment of the articulated lever connected to the handle on both sides.

Another possible embodiment incorporates features whereby the support frame is mounted by its first end portion on the second pivot arrangement with its second pivot axis and extends by its second end portion in the direction towards the rear frame part of the main frame. As a result, the size of the pivot drive and the components bearing the axial fan can be kept relatively small whilst nevertheless providing sufficient adjustment to the inclination of the support frame together with the axial fan disposed on it.

Based on another embodiment, an adjusting device is provided between the support frame and the lifting frame for pivoting the support frame relative to the lifting frame. This makes positioning of the support frame relative to the lifting frame easier as well as setting the inclination of the air flow emitted by the axial fan.

Another embodiment is characterized by the fact that a nozzle head is disposed on the fan housing of the axial fan in an outlet region of the air flow from the latter, having a central nozzle head axis aligned flush with a fan wheel axis of the fan wheel for adding water and optionally a foaming mixture to the air flow, and the nozzle head has a plurality of outlet orifices distributed around the circumference. In addition to improving the air flow, this enables an additional extinguishing agent and/or extinguishing medium to be added to it. Due to the central disposition, the latter can be directed from the center of the axial fan into the air flow.

Another preferred embodiment is characterized by the fact that the nozzle head is hat-shaped and is delimited by a front wall in the region of its outlet side. This enables a geometric shape of the nozzle head to be obtained which is simple to produce and which can be connected to a co-operating component in the region of the axial fan, in particular its fan housing, in an uncomplicated manner.

It is also of advantage if the outlet orifices are provided in the front wall and respectively extend in an outwardly inclined arrangement in their flow direction towards the side facing away from the nozzle head axis. Due to the hat-shaped design and the fact that a front wall is provided means that a collection chamber can be provided inside the nozzle head for the extinguishing agent to be distributed and/or added, the latter being added to or mixed with the air flow via the individual outlet orifices.

Another embodiment is characterized by the fact that a cross-sectional dimension of the individual outlet orifices respectively decreases in the flow direction thereof. This results in a better orientation of the jet of extinguishing agent emitted by the nozzle head, which can be emitted in a more concentrated and/or more bundled shape.

Another possible embodiment incorporates features whereby at least individual ones of the outlet orifices are respectively provided with a V-shaped groove in their outlet region from the front wall, having groove surfaces bounding the groove recessed into the front wall. As a result, in addition to obtaining the directed jet, the jet of extinguishing agent can be more effectively distributed in the air flow.

Based on another embodiment, a line of the groove surfaces of the groove intersects a longitudinal axis of the respective outlet orifice. This results in a symmetrical distribution of the jet of extinguishing agent to be ejected.

Another embodiment is characterized by the fact that the grooves are disposed in a star shape distributed around the circumference. Due to this star-shaped arrangement of the individual grooves in their longitudinal extension from the center of the nozzle head and/or its nozzle head axis respectively, the additional extinguishing agent can be added more uniformly and atomized more effectively into the air flow.

Another preferred embodiment is characterized by the fact that the front wall of the nozzle head is of a frustoconical design. As a result, a simpler and more symmetrical design can be obtained in terms of the inclination of the individual outlet orifices and the circulation through them. This also results in a more symmetrical discharge of the additional extinguishing agent from the individual outlet orifices in the region of the external face.

It is also of advantage if the front wall of the nozzle head has a front face on the outside and at its center, oriented in the direction perpendicular to the nozzle head axis. This enables a defined termination of the nozzle head to be obtained. This also improves the inflow to the additional orifice in the center region.

Another embodiment is characterized by the fact that at least one orifice is also disposed in the front wall of the nozzle head in its center region. This offers another option of improving the way the extinguishing agent is added to the air flow.

Another possible embodiment incorporates features whereby the at least one orifice has a hollow cylindrical flow cross-section. This enables a uniform flow of the additional extinguishing agent out of the nozzle head, including from its center.

Based on another embodiment, the at least one orifice extends parallel with the nozzle head axis. As a result, an additional, predefined quantity of extinguishing agent can also be added to the center of the air flow.

Another embodiment is characterized by the fact that the fan housing has a continuous, spiral-shaped air baffle element around the circumference in its outlet region adjoining the fan wheel. This is a very simple way of providing an air baffle element in the outlet region of the fan housing which can be produced by an endless production process such as extrusion, for example. This saves on additional costs for molds, since otherwise a plurality of different annular air baffle elements would have to be made. This is also a very simple way of catering for the need to make fan housings in different sizes. Due to the fact that the air baffle element is of a continuous design in the region of the front and/or front face of the fan housing, not only can a sufficient amount of air be effectively channeled and directed, a simple protective element is obtained, preventing access to moving parts such as the fan wheel, for example.

Finally, in terms of flow, it is of advantage if the air baffle element has an air baffle element cross-section of an approximately streamlined shape in axial section relative to a fan housing axis of the fan housing.

To provide a clearer understanding, the invention will be described in more detail below with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

The expression "in particular" used hereafter should be understood as meaning that it refers to a possible, more special design or more specific description of an object or method step but not necessarily a preferred embodiment of it or a preferred approach.

FIGS. 1 to 6 illustrate one possible design of a fan unit 1 for mobile use for ventilating, in particular for circulating fresh air, in areas contaminated by smoke and/or other gases, odors or similar, and if necessary for additionally adding an extinguishing agent. The fan unit 1 is designed so that, in most cases, it can be carried by hand by at least one person for its intended use from a deployment vehicle to the deployment site, where it can be deployed as a means of ventilating the deployment area or areas. It is in this context that the term "mobile" should be understood. The fan unit 1 comprises a main frame 2 and an axial fan 3 secured on a lifting frame 4 which is mounted on the main frame 2 preferably, in a pivotable arrangement. The lifting frame 4 may also be described as a pivot frame.

Figure 2:
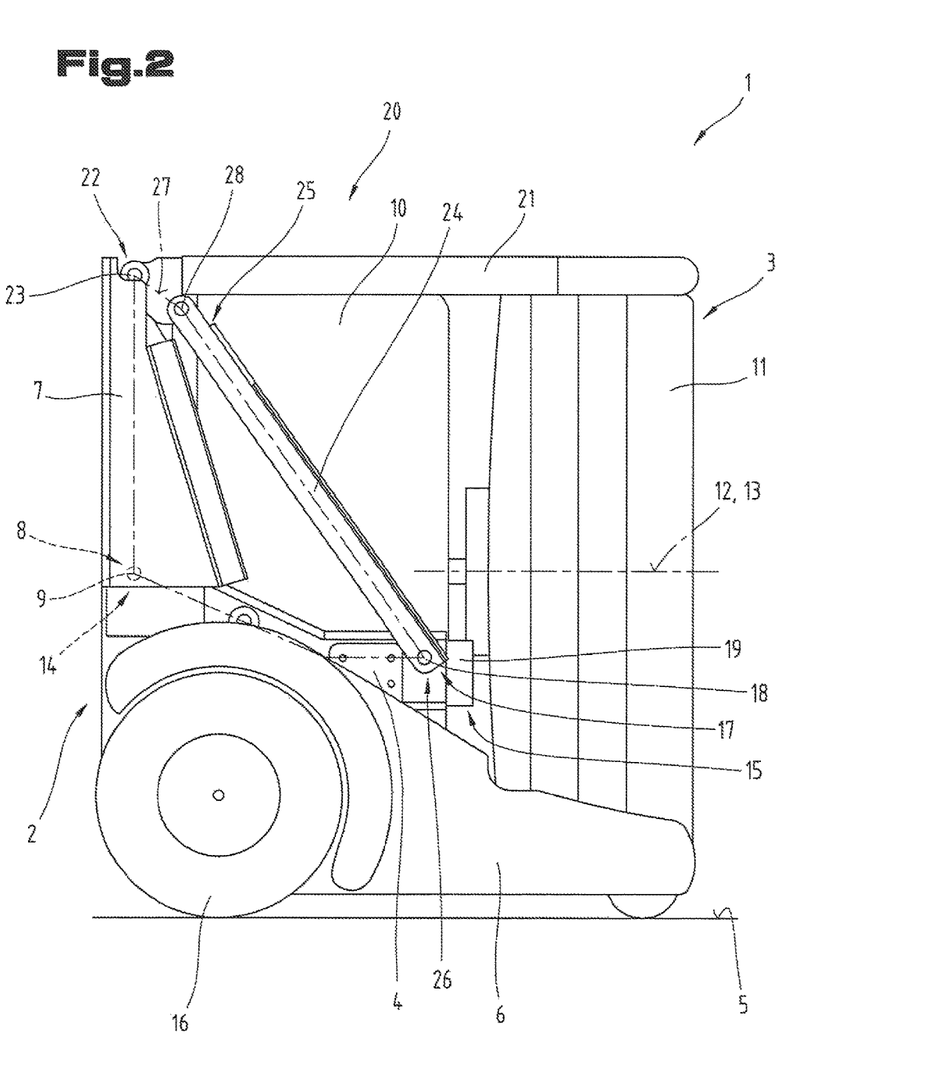
FIG. 2 a side view of the fan unit from FIG. 1 but in its transport position.

The fan unit 1 can be placed or set down on a support surface 5 indicated by a solid line in FIG. 2. The main frame 2 may comprise a separate frame structure made up of several individual parts although for the sake of simplicity here, only a base frame 6 next to the support surface 5 and hence at the floor end and at least one rear frame part 7 extending upwards from the base frame 6 will be described in detail.

The lifting frame 4 is mounted on the main frame 2 so as to be pivotable relative thereto about a first pivot axis 9 defined by a first pivot arrangement 8. Given that the orientation of the support surface 5 is horizontal, the first pivot axis 9 likewise extends horizontally and hence parallel therewith. The first pivot arrangement 8 may also be disposed at a distance from the base frame 6 of the main frame 2 in the vertical direction. Instead of the pivoting movement about the first pivot axis 9, other types of movement for raising the lifting frame 4 would also be possible, e.g. by means of a lever arrangement, a parallelogram lever arrangement or a slide arrangement.

The axial fan 3 may comprise at least one drive unit 10, a fan wheel connected to it in a driving arrangement and a fan housing 11 accommodating the fan wheel. The fan wheel is disposed so as to be rotatable about a fan wheel axis 12 inside the fan housing 11 in a generally known manner. The fan wheel axis 12 and a fan housing axis 13 defined by the fan housing 11 are preferably disposed flush or congruently with one another.

In the embodiment illustrated as an example here, the first pivot arrangement 8 for the lifting frame 4 is disposed in the region of frame part 7 extending upwards from the base frame 6 and in a first end region 14 of the lifting frame 4. The first end region 14 of the lifting frame 4 faces the rear frame part 7 of the main frame 2. The lifting frame 4 therefore also extends out forwards from the rear frame part 7 in the direction towards a front face of the fan unit 1. The lifting frame 4 may be a pivot arm of a bridge-type design.

Due to the fact that the second end region 15 of the lifting frame 4 extends forwards from its first end region 14, the second end region 15 of the lifting frame 4 can be adjusted in terms of its vertical distance from the base frame 6, from a non-operating position lying closer to the base frame 6 into a raised deployment position at a greater distance therefrom.

A set of wheels 16 may also be mounted on the main frame 2, by means of which the main frame 2 together with all the components mounted on it can be moved manually. The set of wheels 16 is disposed in the rear part of the base frame 6 and is preferably stationary. The base frame 6 may be provided in the form of a housing shell, in which case side panels may extend respectively upwards from the floor-end base.

Also in the embodiment illustrated as an example here, uprights extends upwards on the rear side of the base frame 6 in the corner regions and jointly form part of the rear frame part 7. The uprights may be made from one or more bent sheet metal parts which are attached to the base frame 6 and are also spaced at a distance apart from one another in the transverse direction—in other words in the direction of the first pivot axis 9. The pivot axis 9 may be an imaginary axis or alternatively a physical, continuous shaft constituting the first pivot arrangement 8 with associated co-operating bearing points.

Disposed or arranged on the lifting frame 4 is a second pivot arrangement 17 having a second pivot axis 18, the second pivot arrangement 17 being disposed at a distance apart from the first pivot arrangement 8. The second pivot axis 18 is in turn oriented parallel with the first pivot axis 9. The two pivot arrangements 8, 17 are preferably each disposed or mounted in an end region of the lifting frame 4.

A separate support frame 19 is also provided, which is mounted on the lifting frame 4 so as to be pivotable in terms of its position relative to the base frame 6. To this end, a bearing arrangement is provided between the support frame 19 and the lifting frame 4. As a result, an inclination of the air flow generated by the axial fan 3 can be adjusted. The axial fan 3 can therefore be retained on the lifting frame 4 with the support frame 19 connected in between. This means that the entire unit of the axial fan 3 can be retained on or secured to the support frame 19. Due to the options of adjusting the position of the support frame 19 relative to the lifting frame 4 described in more detail below, the orientation of the axial fan 3 and also the direction in which the air flow generated by the axial fan 3 is directed can be adjusted. This bearing arrangement is preferably disposed and/or oriented such that it is flush with the second pivot axis 18. The support frame 19 is therefore mounted so as to be pivotable about the second pivot axis 18 of the lifting frame 4. The second pivot axis 18 may be an imaginary axis or a physical shaft.

In order to effect the adjusting movement of the lifting frame 4 about the first pivot axis 9 and thus lift its second end region 15, a separate pivot drive 20 may be provided. By means of this pivot drive 20, the end region 15 may be both lifted out of its non-operating position into the deployment position and returned to the non-operating position by lowering it. By means of the second pivot arrangement 17 disposed or arranged on it, the second end region 15 of the lifting frame 4 therefore effects a movement along a circle segment about the first pivot axis 9. The pivot drive 20 is disposed on the main frame 2, in particular the rear frame part 7.

The pivot drive 20 comprises at least one handle 21, which is mounted on the main frame 2, in particular the rear frame part 7, in a third pivot arrangement 22 so as to be pivotable about a third pivot axis 23 defined thereby. The third pivot axis 23 is likewise oriented parallel with the first pivot axis 9. The third pivot arrangement 22 is preferably spaced farther apart from the base frame 6 in the vertical direction than the first pivot arrangement 8 and is therefore disposed above the first pivot arrangement 8.

The pivot drive 20 further comprises at least one articulated lever 24 having a first end 25 and a second end 26 spaced apart therefrom. The first end 25 of the articulated lever 24 is articulatingly linked to the handle 21 and the second end 26 is articulatingly linked to the lifting frame 4.

A pivot bearing 28 is disposed or arranged on the at least one handle 21 spaced at a distance apart from the third pivot axis 23 of the third pivot arrangement 22 and serving as an operating lever 27. The operating lever 27 is preferably an integral part of the handle 21 and/or is formed as part of the handle 21. The first end 25 of the articulated lever 24 described above is articulatingly linked to the pivot bearing 28 and is therefore retained with sufficient tensile strength. The articulated lever 24 is connected to the handle 21 by one end. At a second end 26, the articulated lever 24 is articulatingly linked to the lifting frame 4. This linkage is preferably aligned flush with the second pivot axis 18 about which the support frame 19 is also pivotable.

Figure 1:
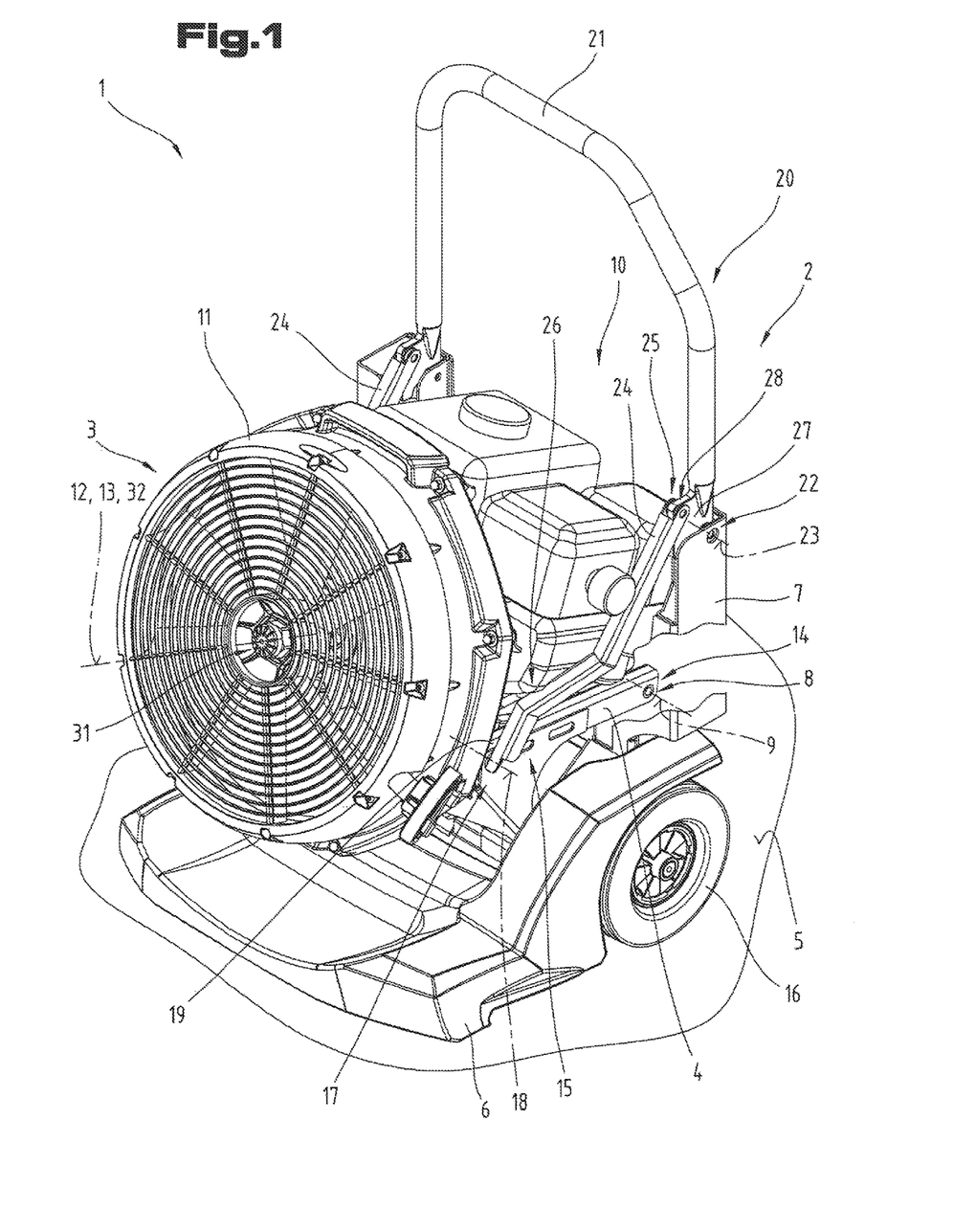
FIG. 1 a schematic diagram of a fan unit in its deployment position.

In order to effect a uniform adjusting movement of the lifting frame 4 together with the axial fan 3 retained on it relative to the main frame 2, one of the articulated levers 24 is provided respectively spaced at a distance apart as viewed in the direction of the second pivot axis 18. Accordingly, the axial fan 3 can be accommodated in the space between them. The handle 21 may be provided in the form of a bow-shaped and/or U-shaped tubular frame. The two legs of the tubular frame are mounted by means of their bearing arrangements so as to be pivotable about the third pivot axis 23 of the third pivot arrangement 22 on the rear frame part 7. When the lifting frame 4 is in the non-operating position, in other words the lowered position of the axial fan 3, the handle 21 or the tubular frame from which it is formed sits in an approximately horizontal orientation, which may also be described as the transport position in which it is brought to and removed from site. This position is illustrated in FIG. 2, and the handle 21 extends out forwards from the rear frame part and/or parts 7 in the direction of the front face. The upwardly pivoted and/or upwardly folded operating position of the handle 21, in particular the tubular frame, is illustrated in FIG. 1. In this instance, the handle 21 and/or the tubular frame forming it extends vertically upwards approximately in the perpendicular direction. The pivot angle between the two positions described above is ca. 90°. However, it would also be possible for the handle 21 or tubular frame from which it is formed to be pivoted from an orientation lying behind the rear frame part 7 pointing in the direction towards the support surface 5 up into a rearwardly extending operating position about ca. 90°. It would also be possible to use this rearwardly extending position during transport to the deployment site—as an intermediate position—in which case the handle is not pivoted into a vertically upright position until reaching the deployment site. This would enable the lifting movement and the associated displacement path to be made longer.

FIGS. 3 to 6 illustrate different positions of the lifting frame 4 and of the support frame 19 mounted on the lifting frame 4 on a highly simplified, schematic basis. The support frame 19 may preferably be mounted on the lifting frame 4 by its first end portion 29 on the second pivot arrangement 17 with its second pivot axis 18. In the embodiment illustrated as an example here, a second end portion 30 of the support frame 19 extends in the direction towards the rear frame part 7 of the main frame 2. An adjusting device that will not be illustrated and described in greater detail may be used to adjust the relative position of the support frame 19 and the associated inclination of the fan wheel axis 12 or fan housing axis 13 with respect to the support surface 5. The adjusting device might be provided in the form of an adjustable cable pull and/or Bowden cable, for example, if necessary co-operating with at least one gas spring. However, a settable and adjustable gas spring or several of them could also be used. The adjusting device may be disposed between the support frame 19 and the lifting frame 4, for example.

Figure 3:
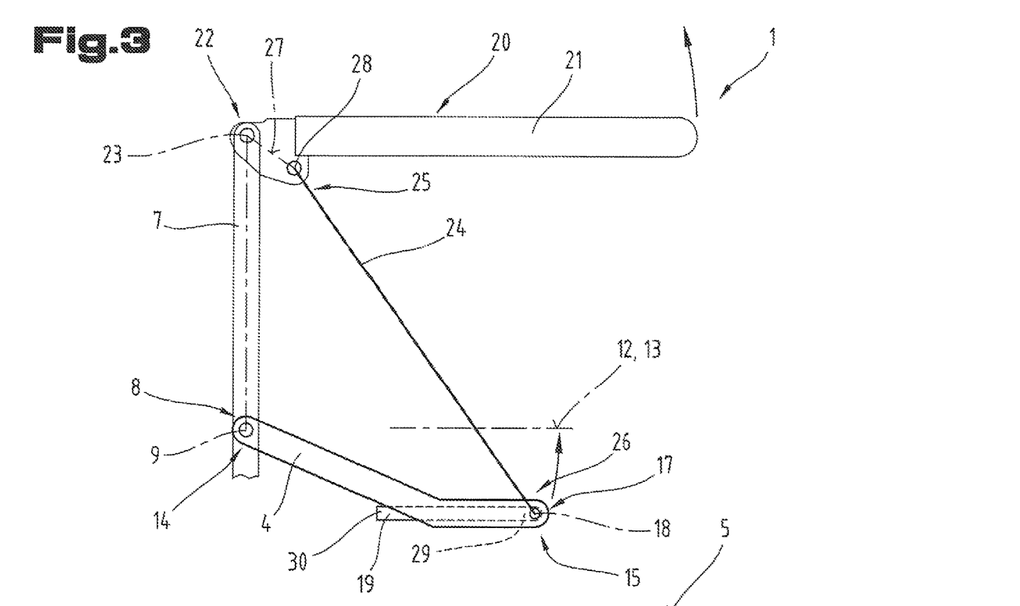
FIG. 3 a schematic diagram showing a side view of the adjusting mechanism for the lifting frame in its transport position.

FIG. 3 provides a simplified illustration of the orientation and positions of the individual components which can be pivoted relative to one another, namely the lifting frame 4, the support frame 19, the handle 21 with its operating lever 27 and the articulated levers 24, in their non-operating position and/or transport position. The handle 21 and/or the bent tube forming it is oriented approximately horizontally and/or parallel with the support surface 5. The lifting frame 4 is mounted on the first pivot arrangement 8 on the rear frame part 7 and is disposed in the lowered non-operating position and/or transport position. The support frame 19 in this instance is oriented approximately horizontally with respect to the support surface 5, and the axial fan 3 and hence its fan wheel axis 12 and the fan housing axis 13 retained on the support frame 19 likewise extend approximately horizontally and hence parallel with the support surface 5.

The articulated lever or levers 24 respectively extend on the handle 21 between the second end region 15 of the lifting frame 4 and the pivot bearing 28. Since the operating lever 27 is also disposed on the handle 21 between its third pivot arrangement 22 and pivot bearing 28 at the same time, the articulated lever or levers 24 can be moved at the same time by means of the handle 21 during its adjusting movement from the transport position into the operating position due to the pivoting movement of the operating lever 27 connected thereto, thereby raising the second end region 15 of the lifting frame 4.

Figure 4:
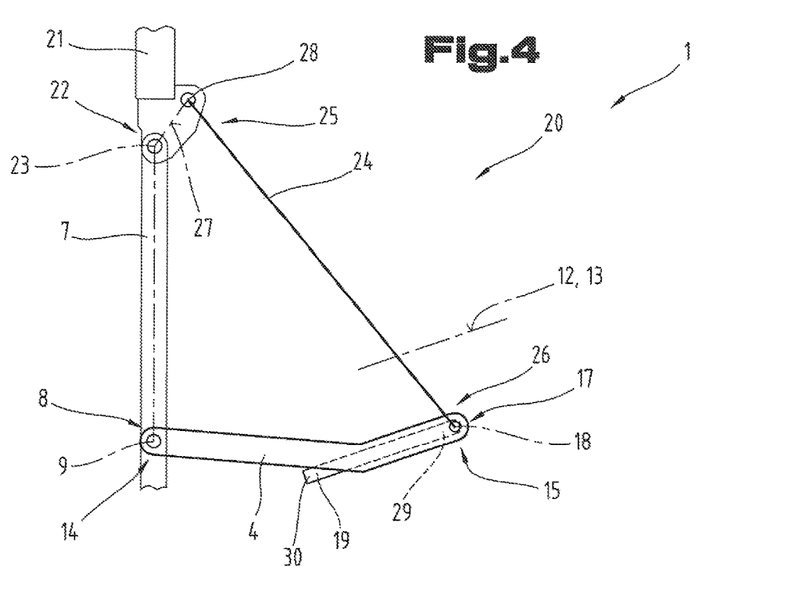
FIG. 4 another schematic diagram showing a side view of the adjusting mechanism with the lifting frame in the raised position and with the fan wheel axis oriented upwards.

The raised position of the lifting frame 4 is illustrated in FIG. 4. Due to this pivoting movement and with this geometric arrangement of the individual components and bearing points relative to one another, the support frame 19 is moved into a rearwardly inclined position, as a result of which the fan wheel axis 12 and the fan housing axis 13 are oriented so that they are tilted upwards towards the front. The air flow generated by the axial fan 3 is emitted in an upwardly inclined arrangement. The angle subtended by the fan wheel axis 12 and/or fan housing axis 13 and the support surface 5 may be 15° to 30° and even more, for example. The angle may also be ca. 20°, for example.

Figure 5:
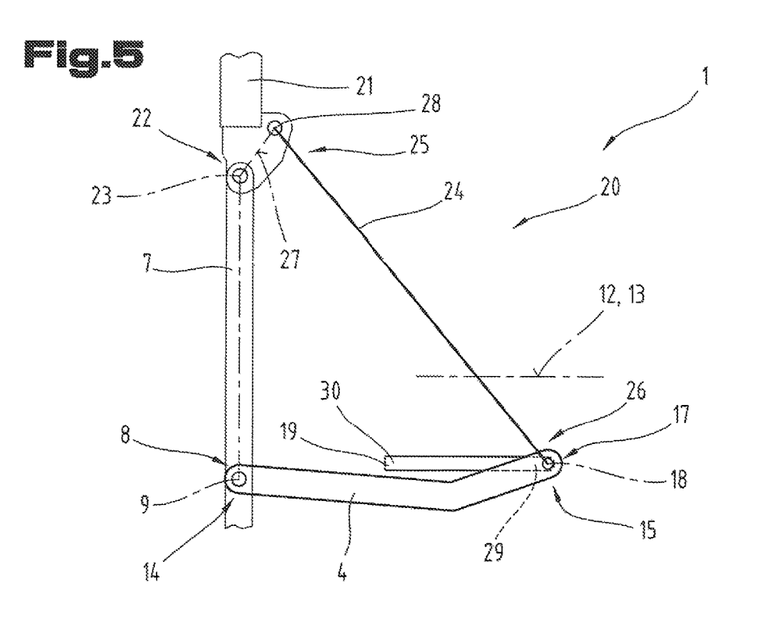
FIG. 5 another schematic diagram showing a side view of the adjusting mechanism with the lifting frame in the raised position and with the fan wheel axis oriented horizontally.

FIG. 5 basically illustrates the same position of the lifting frame 4 as that illustrated in FIG. 3 but with the support frame 19 and hence also the axial fan 3 with the fan wheel axis 12 and/or fan housing axis 13 pivoted into an approximately horizontal orientation. The adjustment may be made by means of the adjusting device described above but not specifically explained or illustrated.

Figure 6:
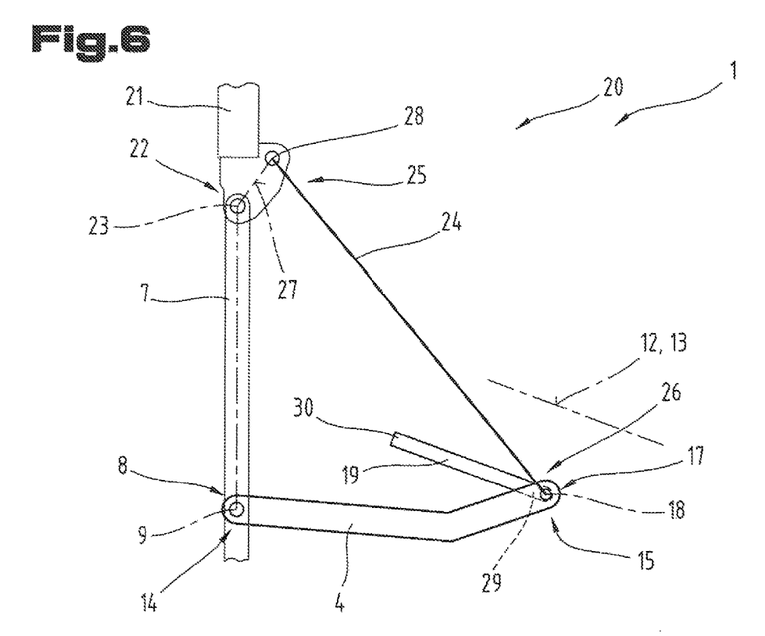
FIG. 6 another schematic diagram showing a side view of the adjusting mechanism with the lifting frame in the raised position and with the fan wheel axis oriented downwards.

Finally, FIG. 6 illustrates the support frame 19 and hence also the axial fan 3 with the fan wheel axis 12 and/or fan housing axis 13 with its second end portion 30 pivoted further upwards about the second pivot axis 18 of the second pivot arrangement 17. Accordingly, the axial fan 3 with the fan wheel axis 12 and/or fan housing axis 13 are tilted downwards at the front. The tilt angle may be the same in terms of amount and/or value as that of the upwardly tilted angle described above. The air flow generated by the axial fan 3 can be pivoted to adjust its inclination relative to the support surface 5 specifically to suit the respective deployment conditions.

Figure 7:
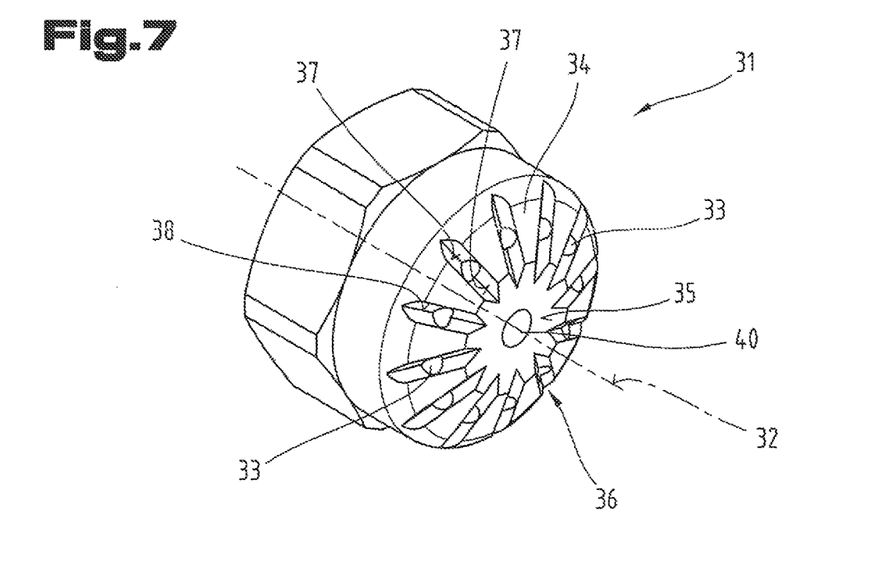
FIG. 7 a schematic diagram of a nozzle head of a nozzle arrangement for the axial fan of the fan unit.
Figure 8:
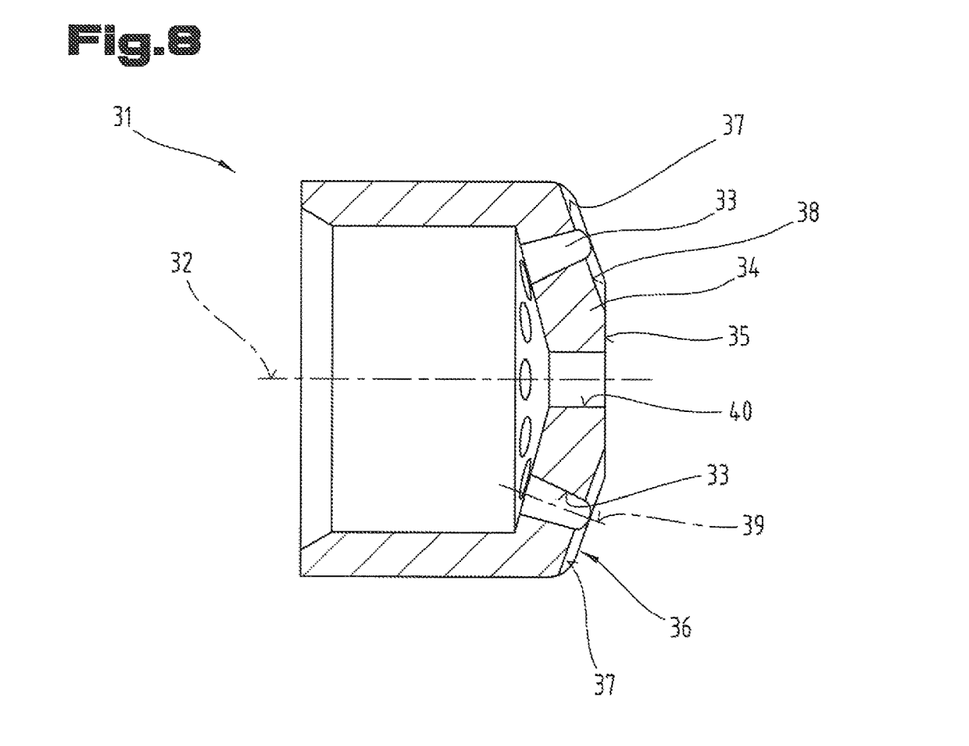
FIG. 8 an axial section through the nozzle head from FIG. 7.
Figure 9:
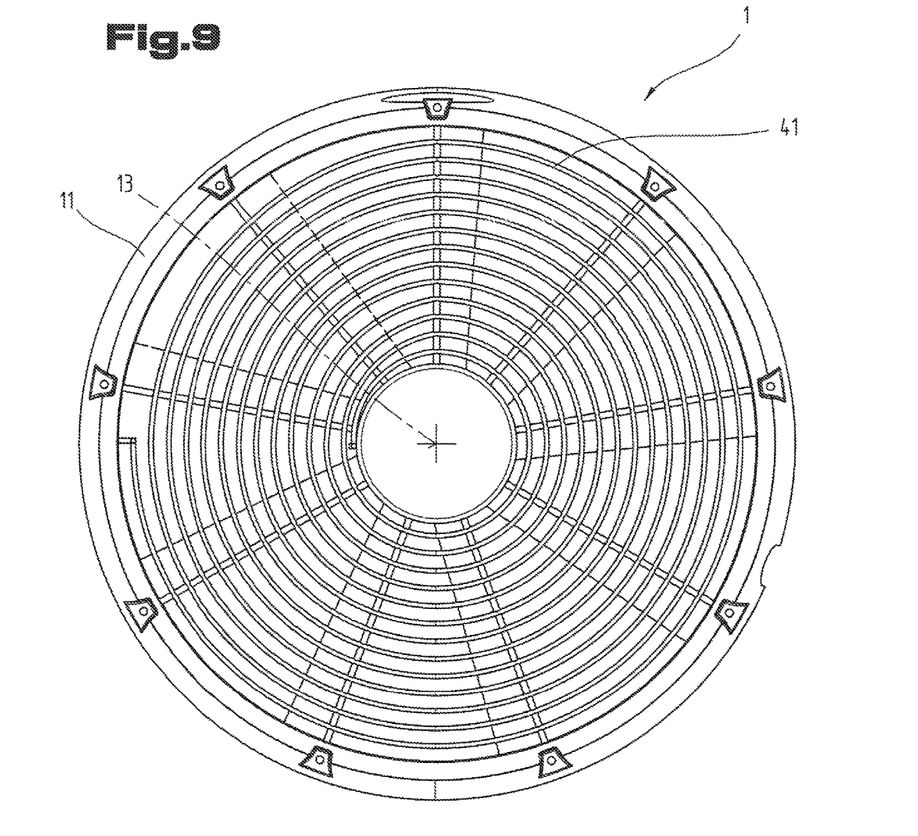
FIG. 9 a view onto the outlet side of the fan housing of the axial fan.
Figure 10:
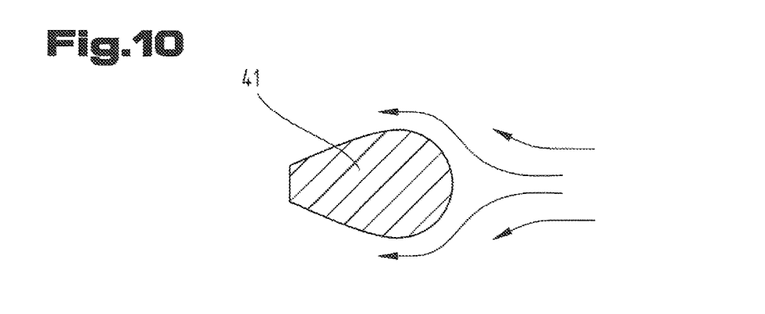
FIG. 10 a cross-section through the air baffle element illustrated in FIG. 9.

FIGS. 7 and 8 illustrate another embodiment of a component for the fan unit 1, in particular its axial fan 3, which may be construed as an independent embodiment in its own right, the same reference numbers and/or component names being used to denote parts that are the same as those described in connection with FIGS. 1 to 6 above. To avoid unnecessary repetition, reference may be made to the more detailed descriptions of FIGS. 1 to 6 given above.

The air flow generated and/or emitted by the axial fan 3 may additionally have a preferred liquid medium added to it, in particular an extinguishing agent and/or extinguishing medium. To this end, as may be seen from FIG. 2 at the center of the axial fan 3 in the region of the fan wheel axis 12 and fan housing axis 13, a nozzle head 31 having a central nozzle head axis 32 is arranged and/or disposed on the fan housing 11 in an outlet region of the air flow therefrom. The central nozzle head axis 32 is preferably disposed in a flush alignment with the fan wheel axis 12 of the fan wheel and/or fan housing axis 13. The nozzle head 31 has a plurality of outlet orifices 33 distributed around the circumference, preferably uniformly. The purpose of the outlet orifices 33 distributed around the circumference is to enable additional medium delivered to the nozzle head 31 via lines, not illustrated, to be added to or incorporated in the air flow flowing circumferentially past it.

The nozzle head 31 is preferably of a hat-shaped design and is bounded and/or closed by a front wall 34 in the region of its outlet side. The front wall 34 of the nozzle head 31 may in turn be of a frustoconical design from the outer circumferential edge towards the center and hence towards the nozzle head axis 32. The front wall 34 may also have a front face 35 on the outside and at its center, oriented perpendicular to the direction of the nozzle head axis 32.

The plurality of outlet orifices 33 distributed around the circumference in this instance are disposed and arranged directly in the front wall 34. Furthermore, the individual outlet orifices 33 may also extend so as to be outwardly inclined in their flow direction towards the side facing away from the nozzle head axis 32. This enables the additional medium entering the nozzle head 31 through the outlet orifices 33 to be incorporated in the circumferentially flowing air flow. As may also be seen from FIG. 7, a cross-sectional dimension of the individual outlet orifices 33 in the flow direction thereof decreases in each case from the inlet region to the outlet region. This enables a certain nozzle and channeling effect to be obtained on the flow of extinguishing medium and/or flow of extinguishing agent formed by the additional medium.

It is also possible for at least individual ones of the outlet orifices 33 to have a V-shaped groove 36 recessed into the front wall 34 in each case in their outlet region from the front wall 34. Accordingly, the individual grooves 36 are bounded by groove surfaces 37 extending parallel with one another which converge with one another in the longitudinal direction. In the region in which the groove surfaces 37 intersect, 
they form an intersection line 38 in each groove, preferably extending in a straight line. Each of the individual grooves 36 is oriented so that the intersection line 38 formed by the groove surfaces 37 is disposed so that it intersects a longitudinal axis 39 of the respective outlet orifice 33. It is also of advantage if the grooves 36 are distributed in a star shape around the circumference. Additionally providing grooves 36 in at least at least individual ones of the outlet orifices 33, but preferably in all of them, enables a better distribution and additional fanning and atomization of the additional medium in the air flow leaving the outlet orifices 33 to be achieved.

It is also possible to arrange or dispose at least one additional orifice 40 in the front wall 34 of the nozzle head 31 in its center region—in other words in the region of the nozzle head axis 32. By contrast with the outlet orifices 33 described above, the at least one orifice 40 may be selected so as to have a hollow cylindrical flow cross-section as viewed across its longitudinal extension. However, it would also be possible to select a conically tapering design for the flow cross-section. Based on this example of an embodiment, the at least one orifice 40 is also disposed in the front wall 34 extending parallel with the nozzle head axis 32. This being the case, another additional medium serving as an extinguishing agent and/or extinguishing medium can also be delivered to the air flow emitted from the center of the fan housing 11.

The additional medium fed through the nozzle head 31 may preferably be water. In addition, a foaming additive may also be added to and/or admixed with the water before it passes through the nozzle head 31.

The nozzle head 31 in combination with the axial fan 3 may be construed as an independent embodiment in its own right.

FIGS. 9 and 10 illustrate another and optionally independent embodiment of a component for the fan unit 1, in particular its axial fan 3, the same reference numbers and component names being used to denote parts that are the same as those described in connection with FIGS. 1 to 8 above. To avoid unnecessary repetition, reference may be made to the more detailed description of FIGS. 1 to 8 given above.

To simplify the design of the outlet region from the fan housing 11, a spiral-shaped continuous air baffle element 41 may be arranged and/or disposed in its outlet region adjoining the fan wheel. Instead of providing a plurality of air baffle elements disposed concentrically with one another of the type usually used, a continuous air baffle element 41 extending in a spiral starting from the outer peripheral region of the fan housing 11 to its center is used. This enables the air baffle element 41 to be made in an endless strand with an appropriately shaped profile geometry, for example. Having been cut to an appropriate length, the continuous air baffle element 41 is then attached to and/or retained on retaining arms, not illustrated, and disposed in a spiral shape with a preferably uniform spacing in the region of the outlet region.

Good flow conditions can be achieved if an air baffle element cross-section of the air baffle element 41 is of an approximately streamlined shape in axial section relative to the fan housing axis 13, i.e. in the flow direction, as may be seen in FIG. 10. The outlet-side end region of the air baffle element 41 may also be of a slightly flattened design. This reduces flow losses and also directs and channels the emitted air flow more effectively. The air baffle element 41 may also serve as a protective grate to prevent undesired access to the rotating fan wheel during operation.

In principle, each of the pivot arrangements 8, 17, 22 described above may also have several bearing points spaced at a distance apart from one another, and the respective co-operating bearing points of each and every one of the pivot arrangements 8, 17, 22 are disposed in alignment with one another. If several bearing points are provided for each pivot arrangement 8, 17, 22, these are respectively disposed or arranged on the common pivot axis 9, 18, 23. The respective bearing points of the individual pivot arrangements 8, 17, 22 can therefore be laterally spaced apart from one another and thus disposed in the transverse direction. The same also applies to the disposition and design of pivot bearing 28.

Additional baffle elements may also be provided between the fan wheel and the air baffle element 41 of the fan housing 11 disposed on the outlet side, which direct and/or deflect the air flow generated by the fan wheel in a predefined and/or directed flow direction. To this end, the individual baffle elements, which are preferably distributed around the circumference in a star shape, have a curved longitudinal contour in the flow direction. This longitudinal contour may also have an approximately airfoil type curvature. The individual baffle elements may also be designed so that they can be inserted in appropriately designed retaining recesses at both ends. Since the fan housing 11 may have tubular housing parts in the region of the center as well as on the external face, the individual baffle elements may preferably be affixed to the housing parts at both ends, resulting in an interchangeable fixing system.

Furthermore, as viewed in the flow direction, the fan housing 11 may be of a split design. The at least two fan housing parts can be coupled with one another by the mutually facing end portions, e.g. by a lock mechanism and/or a latch mechanism. This might be a bayonet fitting or similar, for example. It would also be possible to use an additional screw connection to provide a stable mutual connection.

In addition to the air flow, the axial fan 3 could additionally be used to emit an additional medium in the form of an extinguishing foam. It can then be added to the air flow by means of the nozzle head 31 described above. To this end, a so-called foaming net may be provided in the outlet region of the axial fan, in particular adjoining the air baffle element 41.

In a manner known per se, the drive motor of the drive unit 10 may also drive a separate alternator. The drive motor may be provided in the form of an internal combustion engine. Accordingly, one or more lighting means directly in the region of the fan unit 1 can be supplied with electrical energy by means of this power generator. This will enable the working area around the fan unit 1 to be illuminated during darkness, at least during operation. It would also be possible to provide an energy storage in the form of a battery.

The embodiments illustrated as examples represent possible variants of the fan unit 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Individual features or combinations of features from the different embodiments illustrated and described may also be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1, 2, 3, 4, 5, 6; 7, 8; 9, 10 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the fan unit 1, it and its constituent parts are illustrated to a certain extent out of scale and/or on an enlarged scale and/or on a reduced scale.

List of reference numbers

| | |
|---|---|
| 1 | Fan unit |
| 2 | Main frame |
| 3 | Axial fan |
| 4 | Lifting frame |
| 5 | Support surface |
| 6 | Base frame |
| 7 | Frame part |
| 8 | First pivot arrangement |
| 9 | First pivot axis |
| 10 | Drive unit |
| 11 | Fan housing |
| 12 | Fan wheel axis |
| 13 | Fan housing axis |
| 14 | First end region |
| 15 | Second end region |
| 16 | Set of wheels |
| 17 | Second pivot arrangement |
| 18 | Second pivot axis |
| 19 | Support frame |
| 20 | Pivot drive |
| 21 | Handle |
| 22 | Third pivot arrangement |
| 23 | Third pivot axis |
| 24 | Articulated lever |
| 25 | First end |
| 26 | Second end |
| 27 | Operating lever |
| 28 | Pivot bearing |
| 29 | First end portion |
| 30 | Second end portion |
| 31 | Nozzle head |
| 32 | Nozzle head axis |
| 33 | Outlet orifice |
| 34 | Front wall |
| 35 | Front face |
| 36 | Groove |
| 37 | Groove surface |
| 38 | Intersection line |
| 39 | Longitudinal axis |
| 40 | Orifice |
| 41 | Air baffle element |

The invention claimed is:

1. Fan unit for mobile use for ventilating an area in which it is deployed, the fan unit comprising:

a main frame having a base frame which can be positioned facing a support surface and at least one rear frame part extending up from the base frame, a lifting frame mounted on the main frame so as to be pivotable about a first pivot axis of a first pivot arrangement extending in a horizontal direction, and an axial fan having a drive unit, a fan wheel connected thereto in a driving arrangement, and a fan housing accommodating the fan wheel, which axial fan is retained on the lifting frame, wherein the first pivot arrangement for the lifting frame is disposed on the one hand in a region of the frame part extending up from the base frame and on the other hand in a first end region of the lifting frame facing the rear frame part, wherein the lifting frame is designed so that it projects out from the rear frame part in the direction towards a front face, wherein a second end region of the lifting frame spaced apart from the first end region can be adjusted in terms of its vertical distance from the base frame from a non-operating position lying closer to the base frame into a deployment position raised relative thereto, wherein a second pivot arrangement with a second pivot axis is disposed on the lifting frame, which second pivot arrangement is disposed at a distance apart from the first pivot arrangement, wherein a support frame is mounted on the lifting frame so as to be pivotable in terms of its relative position with respect to the base frame about the second pivot axis of the second pivot arrangement, thereby enabling an inclination of the air flow generated by the axial fan to be adjusted, wherein the axial fan is retained on the lifting frame with the support frame connected in between, wherein a pivot drive is provided on the main frame for moving the lifting frame from its non-operating position into the raised deployment position and vice versa, wherein the pivot drive comprises at least one handle and at least one articulated lever, and the handle is mounted so as to be pivotable about a third pivot axis of a third pivot arrangement disposed on the rear frame part, wherein the at least one articulated lever is articulatingly linked to the at least one handle by its first end and is articulatingly linked to the lifting frame by its second end and the third pivot axis is oriented parallel with the first pivot axis, and wherein the third pivot arrangement is disposed farther from the base frame in the vertical direction than the first pivot arrangement.

2. Fan unit according to claim 1, wherein the lifting frame is formed by a pivot arm of a bridge-type design.

3. Fan unit according to claim 1, wherein the first pivot arrangement is disposed at a distance apart from the base frame of the main frame in the vertical direction.

4. Fan unit according to claim 1, wherein the second pivot axis of the second pivot arrangement is oriented parallel with the first pivot axis.

5. Fan unit according to claim 1, wherein the support frame is mounted by its first end portion on the second pivot arrangement with its second pivot axis and extends by its second end portion in the direction towards the rear frame part of the main frame.

6. Fan unit according to claim 1, wherein an adjuster is provided between the support frame and the lifting frame for pivoting the support frame relative to the lifting frame.

7. Fan unit according to claim 1, wherein a nozzle head is disposed on the fan housing of the axial fan in an outlet region of the air flow from the axial fan, having a central nozzle head axis aligned flush with a fan wheel axis of the fan wheel for adding water and optionally a foaming mixture to the air flow, and the nozzle head has a plurality of outlet orifices distributed around the circumference.

8. Fan unit according to claim 7, wherein the nozzle head is hat-shaped and is delimited by a front wall in the region of its outlet side.

9. Fan unit according to claim 7, wherein the outlet orifices are disposed in the front wall and respectively extend in an outwardly inclined arrangement in their flow direction towards the side facing away from the nozzle head axis.

10. Fan unit according to claim 7, wherein a cross-sectional dimension of the individual outlet orifices respectively decreases in their flow direction.

11. Fan unit according to claim 7, wherein at least individual ones of the outlet orifices are respectively provided with a V-shaped groove in their outlet region from the front wall, having groove surfaces bounding the groove recessed into the front wall.

12. Fan unit according to claim 11, wherein a line of the groove surfaces of the groove intersects a longitudinal axis of the respective outlet orifice.

13. Fan unit according to claim 11, wherein the grooves are disposed in a star shape distributed around the circumference.

14. Fan unit according to claim 8, wherein the front wall of the nozzle head is of a frustoconical design.

15. Fan unit according to claim 8, wherein the front wall of the nozzle head has a front face on the outside and at its center, oriented in the direction perpendicular to the nozzle head axis.

16. Fan unit according to claim 8, wherein at least one orifice is also disposed in the front wall of the nozzle head in its center region.

17. Fan unit according to claim 16, wherein the at least one orifice has a hollow cylindrical flow cross-section.

18. Fan unit according to claim 16, wherein the at least one orifice extends parallel with the nozzle head axis.

19. Fan unit according to claim 1, wherein the fan housing has a continuous, spiral-shaped air baffle element around the circumference in its outlet region adjoining the fan wheel.

20. Fan unit according to claim 19, wherein the air baffle element has an air baffle element cross-section of an approximately streamlined shape in axial section relative to a fan housing axis of the fan housing.

21. Fan unit for mobile use for ventilating an area in which it is deployed, the fan unit comprising:
a main frame having a base frame which can be positioned facing a support surface and at least one rear frame part extending up from the base frame,
a lifting frame mounted on the main frame so as to be pivotable about a first pivot axis of a first pivot arrangement extending in a horizontal direction, and
an axial fan having a drive unit, a fan wheel connected thereto in a driving arrangement, and a fan housing accommodating the fan wheel, which axial fan is retained on the lifting frame,
wherein the first pivot arrangement for the lifting frame is disposed on the one hand in a region of the frame part extending up from the base frame and on the other hand in a first end region of the lifting frame facing the rear frame part,
wherein the lifting frame is designed so that it projects out from the rear frame part in the direction towards a front face,
wherein a second end region of the lifting frame spaced apart from the first end region can be adjusted in terms of its vertical distance from the base frame from a non-operating position lying closer to the base frame into a deployment position raised relative thereto,
wherein a second pivot arrangement with a second pivot axis is disposed on the lifting frame, which second pivot arrangement is disposed at a distance apart from the first pivot arrangement,
wherein a support frame is mounted on the lifting frame so as to be pivotable in terms of its relative position with respect to the base frame about the second pivot axis of the second pivot arrangement, thereby enabling an inclination of the air flow generated by the axial fan to be adjusted,
wherein the axial fan is retained on the lifting frame with the support frame connected in between,
wherein a pivot drive is provided on the main frame for moving the lifting frame from its non-operating position into the raised deployment position and vice versa,
wherein the pivot drive comprises at least one handle and at least one articulated lever, and the handle is mounted so as to be pivotable about a third pivot axis of a third pivot arrangement disposed on the rear frame part,
wherein the at least one articulated lever is articulatingly linked to the at least one handle by its first end and is articulatingly linked to the lifting frame by its second end and the third pivot axis is oriented parallel with the first pivot axis, and
wherein a pivot bearing is disposed at a distance apart from the third pivot axis on the at least one handle forming an operating lever, on which pivot bearing the first end of the articulated lever is articulatingly linked to the handle.

22. Fan unit for mobile use for ventilating an area in which it is deployed, the fan unit comprising:
a main frame having a base frame which can be positioned facing a support surface and at least one rear frame part extending up from the base frame,
a lifting frame mounted on the main frame so as to be pivotable about a first pivot axis of a first pivot arrangement extending in a horizontal direction, and
an axial fan having a drive unit, a fan wheel connected thereto in a driving arrangement, and a fan housing accommodating the fan wheel, which axial fan is retained on the lifting frame,
wherein the first pivot arrangement for the lifting frame is disposed on the one hand in a region of the frame part extending up from the base frame and on the other hand in a first end region of the lifting frame facing the rear frame part,
wherein the lifting frame is designed so that it projects out from the rear frame part in the direction towards a front face,
wherein a second end region of the lifting frame spaced apart from the first end region can be adjusted in terms of its vertical distance from the base frame from a non-operating position lying closer to the base frame into a deployment position raised relative thereto,
wherein a second pivot arrangement with a second pivot axis is disposed on the lifting frame, which second pivot arrangement is disposed at a distance apart from the first pivot arrangement,
wherein a support frame is mounted on the lifting frame so as to be pivotable in terms of its relative position with respect to the base frame about the second pivot axis of the second pivot arrangement, thereby enabling an inclination of the air flow generated by the axial fan to be adjusted, wherein the axial fan is retained on the lifting frame with the support frame connected in between, and wherein articulated levers are provided respectively, spaced apart from one another in the direction of the second pivot axis, and in each case the second ends of the articulated levers are articulatingly connected to the lifting frame in alignment with the second pivot axis.

23. Fan unit for mobile use for ventilating an area in which it is deployed, the fan unit comprising:

a main frame having a base frame which can be positioned facing a support surface and at least one rear frame part extending up from the base frame, a lifting frame mounted on the main frame so as to be pivotable about a first pivot axis of a first pivot arrangement extending in a horizontal direction, and an axial fan having a drive unit, a fan wheel connected thereto in a driving arrangement, and a fan housing accommodating the fan wheel, which axial fan is retained on the lifting frame, wherein the first pivot arrangement for the lifting frame is disposed on the one hand in a region of the frame part extending up from the base frame and on the other hand in a first end region of the lifting frame facing the rear frame part, wherein the lifting frame is designed so that it projects out from the rear frame part in the direction towards a front face, wherein a second end region of the lifting frame spaced apart from the first end region can be adjusted in terms of its vertical distance from the base frame from a non-operating position lying closer to the base frame into a deployment position raised relative thereto, wherein a second pivot arrangement with a second pivot axis is disposed on the lifting frame, which second pivot arrangement is disposed at a distance apart from the first pivot arrangement, wherein a support frame is mounted on the lifting frame so as to be pivotable in terms of its relative position with respect to the base frame about the second pivot axis of the second pivot arrangement, thereby enabling an inclination of the air flow generated by the axial fan to be adjusted, wherein the axial fan is retained on the lifting frame with the support frame connected in between, wherein a pivot drive is provided on the main frame for moving the lifting frame from its non-operating position into the raised deployment position and vice versa, wherein the pivot drive comprises at least one handle and at least one articulated lever, and the handle is mounted so as to be pivotable about a third pivot axis of a third pivot arrangement disposed on the rear frame part, wherein the at least one articulated lever is articulatingly linked to the at least one handle by its first end and is articulatingly linked to the lifting frame by its second end and the third pivot axis is oriented parallel with the first pivot axis, and wherein the handle is formed by a bow-shaped tubular frame and can be pivoted from a transport position oriented in an approximately horizontal direction into an operating position extending upright in an approximately vertical direction.

* * * * *